United States Patent Office 3,271,639
Patented Sept. 6, 1966

3,271,639
INTEGRATED CIRCUIT STRUCTURES INCLUDING UNIJUNCTION TRANSISTORS

Angel G. Jordan, Pittsburgh, Pa., assignor to Westinghouse Electric Corporation, East Pittsburgh, Pa., a corporation of Pennsylvania
Filed Mar. 10, 1961, Ser. No. 94,867
2 Claims. (Cl. 317—235)

This invention relates generally to semiconductor devices which include within a monolithic body the functional equivalent of two or more conventional devices and, more particularly, to monolithic semiconductor devices wherein the functional equivalent of a unijunction transistor is incorporated in combination with the functional equivalents of one or more other conventional devices.

In my copending application, Serial No. 94,868, filed March 10, 1961, and assigned to the same assignee as the present invention, there are disclosed circuits wherein a unijunction transistor in combination with other elements provides a high Q inductance. One of the desirable features of these circuits is the simplicity of the necessary semiconductor structure as opposed to most other means of providing an inductance with semiconductor elements. The unijunction transistor, also known as the double base diode, as is well known, requires only a base and emitter region and as discussed in the copending application the base region provides both an inductance and a negative resistance effect and is therefore in sense a multi-functional region. It would be highly desirable to be able to employ such an inductance element in monolithic semiconductor devices embodying molecular electronic concepts to provide devices having small size and a minimum number of soldered connections and a maximum number of functions provided per unit volume.

It is therefore an object of the present invention to provide improved semiconductor devices which are the functional equivalent of a unijunction transistor in combination with other semiconductor components within a monolithic body.

Another object is to provide semiconductor devices suitable for use as inductive circuit elements.

Another object is to provide semiconductor devices suitable for use in tuned amplifier circuits.

In accordance with this invention, in one modification, semiconductor structures are provided which provide the functional equivalent of a unijunction transistor in the same body of material in combination with the functional equivalent of a bipolar transistor. Also, other devices are provided wherein the functional equivalent of a unijunction transistor is provided within the same body of material in combination with the functional equivalent of a resistor cooperating with the unijunction transistor functional equivalent either for biasing or for compensating for the negative resistance of the unijunction transistor. Also there are provided monolithic devices incorporating at least the functional equivalents of a bipolar transistor, a unijunction transistor and one or more resistors within the same body of material, all associated in cooperative relationship.

The features of the present invention which are believed to be novel are set forth with particularity in the appended claims. The present invention, both as to its organization and manner of operation, together with the above mentioned further objects and advantages thereof, may best be understood by reference to the following description, taken in connection with the accompanying drawings, in which:

Figure 1:
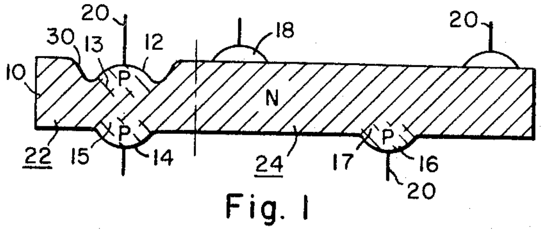
FIGURE 1 is a cross sectional view of a semiconductor device in accordance with the present invention.

A monolithic semiconductor device illustrative of the present invention is shown in FIG. 1, and it is suitable for use in a tuned amplifier circuit, for example. The device comprises a first region 10 of semiconductive material of a first type of semiconductivity which, as an example, will be taken as n-type. Second and third regions 12 and 14 of semiconductive material of p-type conductivity are disposed opposite each other on the upper and lower surfaces on the first region and form first and second p-n junctions 13 and 15 therewith. A fourth region 16 of semiconductive material, also of p-type semiconductivity, is disposed also on the lower surface of the first region 10 and forms a third p-n junction 17 therewith. On the upper surface of the first region a pair of ohmic contacts 18 and 19 are disposed so that the path between them extends from one side to the other side of the vertical projection of the third p-n junction 17. The second, third and fourth regions 12, 14 and 16 as well as the ohmic contacts 18 and 19 are provided with leads such as the wires 20 to enable connection to an external circuit.

Figure 2:
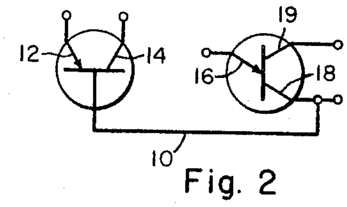
FIGURE 2 is the equivalent circuit in conventional symbols of the device of FIGURE 1.

The device of FIGURE 1 may be for convenience thought of as comprising two integral and continuous portions 22 and 24 separated by the dot and dash line. The first portion 22 comprising the second and third regions 12 and 14 and left hand part of the first region 10 on which they are disposed provides the functional equivalent of a bipolar junction transistor as shown in the left hand portion of FIGURE 2, where the reference numerals refer to the corresponding part of the monolithic device of FIGURE 1. It will be noted however that unlike ordinary junction transistors, only two electrodes are provided on the first portion 22, these being to the emitter and collector equivalents 12 and 14 of the device. The left hand portion of the region 10 serves as a base region of the transistor functional equivalent, however, it is integral with and continuous with the right hand portion of region 10 of the second portion 24 of the device which comprises the functional equivalent of a unijunction transistor. The second portion 24 comprises the fourth semiconductive region 16 and the first and second ohmic contacts 18 and 19. As shown in the right hand portion of FIGURE 2, the fourth region 16 serves as the emitter of the unijunction transistor functional equivalent while the portion of the first region 10 on which it is disposed serves as the base region and the ohmic contacts 18 and 19 serve as the base contacts.

The device configuration of FIGURE 1 can be incorporated in more comprehensive monolithic devices which include additional cooperating electronic components as will be set forth hereinafter.

The device shown in FIGURE 1 alone or in a monolithic device which includes additional components is suitable for use in tuned amplifier circuits wherein the bipolar transistor provides the amplifying function while the unijunction transistor serves as an inductance element suitable for tuning the amplifier.

Figure 3:
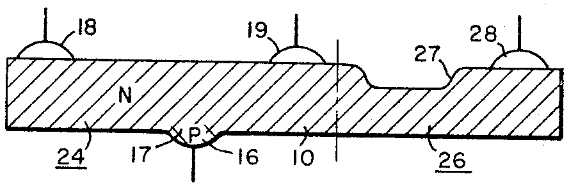
FIGURE 3 is a cross sectional view of another semiconductor device in accordance with the present invention.

In FIGURE 3 there is shown another monolithic device which has a first portion 24 to the left of the dot and dash line corresponding substantially to the second portion 24 of the device of FIGURE 1 and providing the functional equivalent of a unijunction transistor. In this device, the first region 10 of semiconductive material has in a second portion 26 thereof a groove 27 disposed between the ohmic contact 19 and an ohmic contact 28 to provide for a selected resistance therebetween whereby portion 26 of the region is the functional equivalent of a resistor. The portion 26 operates as a bias resistor to place the unijunction transistor functional equivalent at a desired operating point of its characteristic curve upon the application of suitable potentials thereto.

Figure 4:
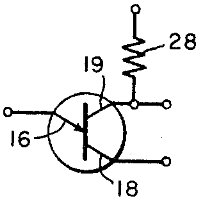
FIGURE 4 is the equivalent circuit in conventional symbols of the device of FIGURE 3.

The equivalent circuit in conventional symbols of the device of FIG. 3 is shown in FIGURE 4 where the reference numerals refer to the corresponding parts of the monolithic device of FIGURE 3.

Figure 5:
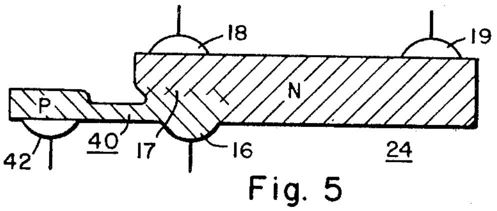
FIGURE 5 is a cross-sectional view of another device in accordance with this invention.

Another device embodying the features of the present invention is that shown in FIG. 5 wherein the features of the device of FIG. 1 to provide the functional equivalent of a unijunction transistor are included and designated by the same reference numerals as in FIG. 1, in combination with a resistance portion 40 and ohmic contact 42 therewith. The portion 40 is a reduced continuous and integral part of the region 16 which serves as the emitter of the unijunction transistor functional equivalent.

Figure 6:
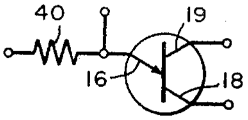
FIGURE 6 is the equivalent circuit in conventional symbols of the device of FIGURE 5.

The usefulness of the device of FIG. 5 results from the fact that a high Q inductance is provided by a unijunction transistor having a positive resistance serially connected with the emitter thereof to compensate for the negative resistance of the unijunction transistor. This is also shown and described in my beforementioned copending application. In FIG. 5 such a high Q device is provided in a monolithic device through proper dimensioning of the portion 40 or use of other techniques such as varying the volume resistivity of the portion 40, to obtain the desired positive resistance. FIG. 6 shows the equivalent circuit in conventional symbols of the device of FIG. 5, using the same reference numerals for corresponding elements.

Figure 7:
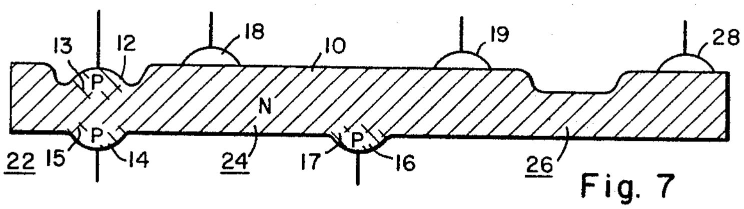
FIGURE 7 is a cross sectional view of a semiconductor device in accordance with this invention which includes features of the devices shown in both FIGURES 1 and 3.

In FIGURE 7 there is shown another monolithic semiconductor device which by combining the features of both the devices of FIGURES 1 and 3 provides the functional equivalents of a bipolar transistor in a first portion 22, a unijunction transistor in a second portion 24 and a bias resistor in a third portion 26 where the reference numerals employed are the same as those of FIGURES 1 and 3.

Figure 8:
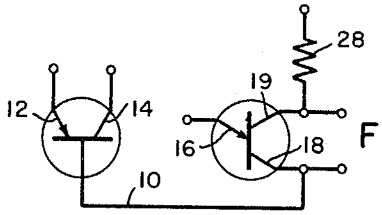
FIGURE 8 is the equivalent circuit in conventional symbols of the device shown in FIG. 7.

FIGURE 8 shows the equivalent circuit in conventional symbols of the device of FIGURE 7 employing like reference numerals for corresponding individual elements.

It will, of course, be apparent to those skilled in the art that the geometry used in providing devices in accordance with this invention may be other than that shown in the drawing. For example, the thickness of the first semiconductive region 10 between the second and third regions 12 and 14 may be varied to produce desired transistor characteristics and the location of the fourth semiconductive region 16 and the first and second base contacts 18 and 19 may be varied to provide described unijunction transistor characteristics. Of course, the first region 10 may be of either p or n-type material with the second, third and fourth regions 12, 14 and 16 being of opposite conductivity type. The incorporation of an intrisically conductive layer, in addition to those layers shown, is also practical. The semiconductive material may be selected from any of the known materials including germanium, silicon and III–V compounds with any well known doping impuritiles used to provide the regions of different conductivity type.

The described devices may be made by a variety of well known techniques including alloying techniques, difusion techniques or a combination of both. Merely as an example, the following method may be used to fabricate one form of the device of FIG. 1.

Figure 9:
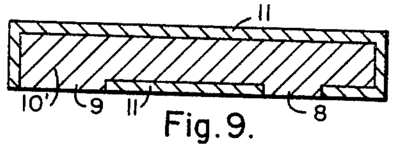
FIGURES 9–11 are cross-sectional views of the device of FIGURE 1 at various stages of preparation.

Referring to FIG. 9, starting with a wafer 10' of N-type silicon having a relatively high resistivity of about 50 ohm-cm. and dimensions of about 3 mm. length 0.25 mm. thickness, and of a width of one mm. or more, all surfaces are covered with a layer 11 of silicon dioxide, except those portions 8 and 9 where the regions 14 and 16 are to be disposed. The silicon dioxide layer 11 may be produced by heat treatment of a silicon wafer in an oxidizing atmosphere at 900° C.

Figure 10:
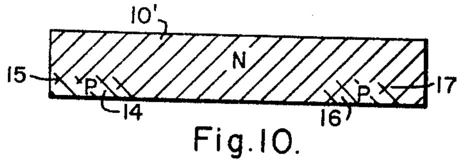

A P-type impurity such as aluminum is then diffused into the silicon at the exposed portions 8 and 9 by heating to a temperature of approximately 1200° C. for a few minutes in an atmosphere containing aluminum vapor. Then the silicon dioxide layer is etched away by applying to the silicon wafer hydrofluoric acid. The structure which results is shown in FIG. 10 having the diffused regions 14 and 16 forming p-n junctions 15 and 17 in the wafer 10.

Figure 11:
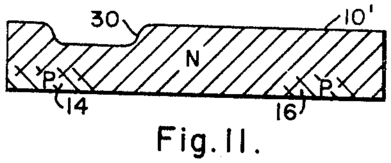

An acid resisting wax is then applied on the surface of the body except for the portion opposite to the region 14. That portion is then etched with a mixture of hydrofluoric and nitric acids so as to obtain the groove 30 of desired distance from the junction 15 required for transistor operation, as shown in FIG. 11. Then an alloy foil containing aluminum is disposed on the bottom of the etched groove 30 of the body 10' and heated to a temperature of about 700° C. to alloy therewith and to form the first P-N junction 13 and the region 12. In the same operation other alloy foils or pellets, such as silver or gold, either pure or containing an n-type impurity such as 0.5% antimony, may be disposed on the upper surface to form the first and second ohmic contacts 18 and 19. At the same time, or subsequently, the additional ohmic contacts necessary on the third and fourth regions may be made in a similar manner using P-type alloy foils of silver or gold containing aluminum. Leads can be readily soldered to the contacts. The resulting structure is that shown in FIG. 1.

The devices of FIGS. 3 and 7 may be made in a similar manner. One additional ohmic contact is applied in each case, in the same operation in which the first two are made. Etching with nitric-hydrofluoric acid is employed to provide the necessary physical configuration to produce the desired resistivity between the third ohmic contact 28 and the base contact 19. The device of FIG. 5 may be similarly made with the portion 40 formed with the region 16 by diffusion of a doping impurity onto a much greater area of the wafer, and the entire end is then etched away so the p-n junction 17 is confined to that area necessary for the region 16 proper.

While the disclosed devices are particularly advantageous for use in circuits wherein the unijunction transistor functional equivalent is employed as an inductance, it is of course the case that the devices may be utilized for other more conventional purposes.

Figure 12:
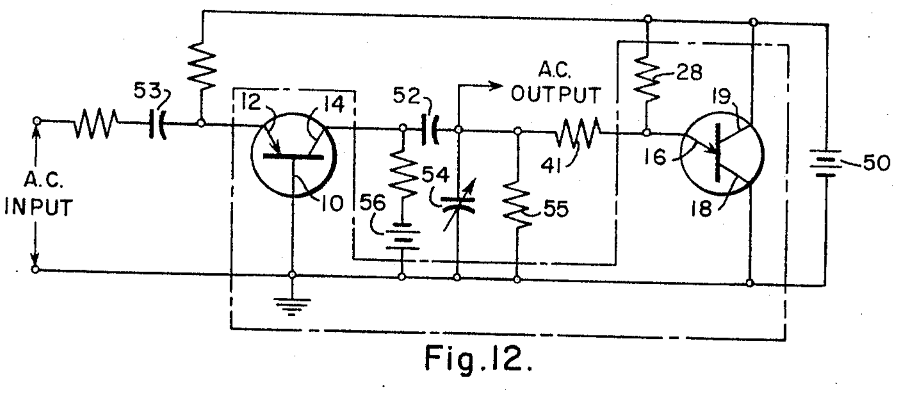
FIGURE 12 is a diagram of a tuned amplifier circuit adapted to utilize the semiconductor devices shown in FIGURES 1, 3 or 7.

In FIGURE 12, there is shown one application of the device of FIGURE 7 in a tuned amplifier circuit. It is of course obvious that either of the devices of FIGS. 1, 3 or 5 may be similarly used in this circuit with an additional conventional element. The dotted line encloses those elements whose functional equivalents are provided by the block of FIG. 7. The circuit shown is a tuned amplifier circuit. A bias resistor 28 is used to place the unijunction transistor functional equivalent in the negative resistance region of its characteristic curve by the application of potential thereto from the source 50 as shown. An additional resistance 41 is connected to the emitter 16 of the unijunction transistor functional equivalent. The resistance 41 is for the same purpose as 40 shown in the device of FIG. 5, and is provided for compensating for the negative resistance of the device, as was disclosed in the beforementioned copending application, in order to provide a high Q inductance. Further provided in the circuit are blocking capacitors 52 and 53, a tuning capacitor 54, a load resistor 55, and other resistors and a bias potential source 56 provided in accordance with well known circuit practice incorporating the teachings of the beforementioned copending application.

Figure 14:
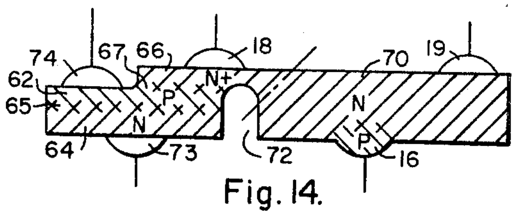
FIGURE 14 is a cross-sectional view of a semiconductor device suitable for use in the circuit of FIG. 13.
Figure 13:
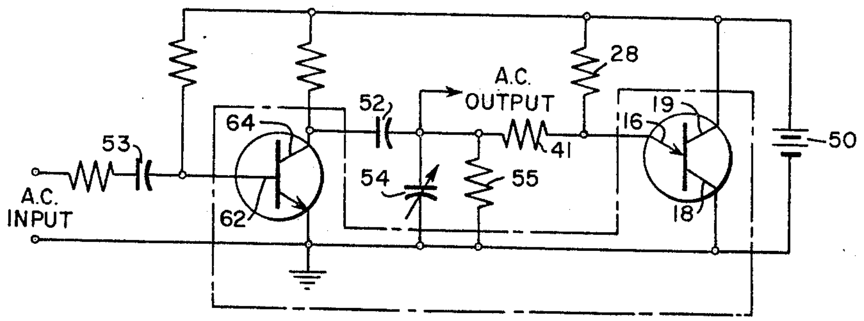
FIGURE 13 is a diagram of another tuned amplifier circuit.

FIG. 13 shows another tuned amplifier circuit similar to that of FIG. 12 but having the advantage of requiring only one source of bias potential. However, it is necessary that there be employed an N-P-N type bipolar transistor with a unijunction transistor having a P-type emitter on an N-type base (or opposite polarity). A suitable monolithic device to be employed for the portions enclosed in dotted lines in the circuit of FIG. 13 is shown in FIG. 14 which in the left hand portion thereof constitutes a transistor which includes a first region 62 of a first type of semiconductivity having regions 64 and 66 of opposite semiconductivity type on opposite sides thereof and forming first and second P-N junctions 65 and 67 therewith. The first and second regions 62 and 64 are separated from the remainder of the bulk material 70 by a groove 72. By this construction the region 66 serves as the emitter for the transistor. Therefore, there is only one ohmic contact 18 serving as both the contact to the emitter of the bipolar transistor functional equivalent and as a base contact on the unijunction transistor functional equivalent. Fabrication of the device of FIG. 14 may be accomplished by the general techniques previously discussed including a double diffusion into the wafer to form the first and third regions 62 and 66, respectively, and subsequently etching to provide the groove 72 and to expose the left hand end of region 62. In this way, there is formed, starting with an n-type wafer, a p-region 62 formed by the first diffusion operation, an n-region 64 of material from the original wafer which has been unchanged, an n+ region 66 formed by the second diffusion operation by which the p-region formed by the first diffusion is reduced in size. Ohmic contact 73 is then attached to region 64 which ohmic contact 74 is attached to region 62 to provide for a base contact.

While the present invention has been shown and described in certain forms only, it will be obvious to those skilled in the art that it is not so limited but is susceptible to various changes and modifications without departing from the spirit and scope thereof.

I claim as my invention:

1. A monolithic semiconductor device suitable for use in a tuned amplifier circuit comprising: a first region of semiconductive material of a first type of semiconductivity having first and second integral and continuous portions; second and third regions of semiconductive material of a second type of semiconductivity disposed on opposite surfaces of said first portion only of said first region and forming first and second p-n junctions therewith; a fourth region of semiconductive material of said second type semiconductivity disposed on a surface of said second portion of said first region and forming a third p-n junction therewith; first and second ohmic contacts disposed on a surface of said second portion of said first region with said fourth region therebetween so that the path of flow of electrical current between said ohmic contacts extends past said third p-n junction; said first portion of said first region and said second and third regions thereby forming the functional equivalent of a bipolar transistor; said second portion of said first region, said fourth region and said first and second ohmic contacts thereby forming the functional equivalent of a unijunction transistor having a common semiconductive region with said bipolar transistor functional equivalent.

2. A monolithic semiconductor device suitable for use in a tuned amplifier circuit comprising: an elongated first region of semiconductive material of a first type of semiconductivity having first, second and third integral and continuous portions and first and second opposite surfaces extending through said portions; second and third regions of semiconductive material of a second type of semiconductivity disposed respectively on said first and second surfaces of said first portion only of said first region and forming first and second p-n junctions therewith; a fourth region of semiconductive material of said second type of semiconductivity disposed on said first surface of said second portion of said first region and forming a third p-n junction therewith; first and second ohmic contacts disposed on said second surface of said second portion of said first region with said fourth region therebetween so that the path between said ohmic contacts extends past and is substantially parallel to said third p-n junction; a third ohmic contact disposed on said second surface of said third portion of said first region surface, part of said third portion between said third ohmic contact and said first and second ohmic contacts having a restricted thickness so that the resistance between said third ohmic contact and the nearest of said first and second ohmic contacts is of a predetermined value; said first portion of said first region and said second and third regions thereby forming the functional equivalent of a bipolar transistor; said second portion of said first region, said fourth region and said first and second ohmic contacts thereby forming the functional equivalent of a unijunction transistor capable of serving as an inductance element to provide tuning for said bipolar transistor functional equivalent; said third portion of said first region and third ohmic contact thereby forming the functional equivalent of a resistor being physically common with the base of said unijunction transistor functional equivalent and the base of said bipolar transistor functional equivalent, said resistor capable of serving as a bias resistor to place said unijunction transistor functional equivalent at a desired operating point upon the application of suitable potentials thereto.

References Cited by the Examiner

UNITED STATES PATENTS

| | | | |
|---|---|---|---|
| 2,985,804 | 5/1961 | Buie | 317—235 |
| 3,010,033 | 11/1961 | Noyce | 307—88.5 |
| 3,038,085 | 6/1962 | Wallmark et al. | 317—235 |
| 3,070,762 | 12/1962 | Evans | 317—235 X |
| 3,097,336 | 7/1963 | Sziklai et al. | 317—235 X |
| 3,114,867 | 12/1963 | Szekely | 317—235 |
| 3,118,114 | 1/1964 | Barditch | 317—235 X |
| 3,173,101 | 3/1965 | Stelmak | 317—234 X |

JOHN W. HUCKERT, *Primary Examiner.*

A. S. KATZ, R. SANDLER, *Assistant Examiners.*